United States Patent
Casini

(10) Patent No.: US 9,859,571 B2
(45) Date of Patent: Jan. 2, 2018

(54) ACTIVATION AND OPERATION MODE SYSTEM FOR AN ELECTRO CHEMICAL BATTERY FOR THE PROPULSION OF MARINE, IN PARTICULAR SUBMARINE MEANS

(71) Applicant: Whitehead Sistemi Subacquei S.p.A., Rome (IT)

(72) Inventor: Francesco Casini, Rome (IT)

(73) Assignee: WHITEHEAD SISTEMI SUBACQUEI S.P.A., Rome (IT)

( * ) Notice: Subject to any disclaimer, the term of this patent is extended or adjusted under 35 U.S.C. 154(b) by 277 days.

(21) Appl. No.: 14/864,199

(22) Filed: Sep. 24, 2015

(65) Prior Publication Data

US 2016/0090161 A1 Mar. 31, 2016

(30) Foreign Application Priority Data

Sep. 25, 2014 (IT) .............................. TO2014A0760

(51) Int. Cl.
| | |
|---|---|
| *H01M 6/34* | (2006.01) |
| *B63H 21/17* | (2006.01) |
| *B63H 21/38* | (2006.01) |
| *F42B 19/24* | (2006.01) |
| *H01M 2/40* | (2006.01) |
| *B63G 8/08* | (2006.01) |

(52) U.S. Cl.
CPC ................ *H01M 6/34* (2013.01); *B63G 8/08* (2013.01); *B63H 21/17* (2013.01); *B63H 21/38* (2013.01); *F42B 19/24* (2013.01); *H01M 2/40* (2013.01); *B63B 2209/04* (2013.01); *H01M 2220/20* (2013.01)

(58) Field of Classification Search
None
See application file for complete search history.

(56) References Cited

U.S. PATENT DOCUMENTS

2007/0105460 A1* 5/2007 Vivien .................... F42B 19/26
440/6
2014/0113210 A1 4/2014 Gerlier et al.

FOREIGN PATENT DOCUMENTS

EP 0669666 8/1995

OTHER PUBLICATIONS

Itialian Search Report dated Jun. 5, 2015 corresponding to Italian Application No. TO20140760; 7 pages.

* cited by examiner

*Primary Examiner* — Ula C Ruddock
*Assistant Examiner* — Tony Chuo
(74) *Attorney, Agent, or Firm* — Ohlandt, Greeley, Ruggiero & Perle, LLP

(57) ABSTRACT

An activation and operation mode system for an electrochemical battery for the propulsion of marine craft, in particular for torpedoes; the system being equipped with an inlet valve for the inflow of water from the outside environment, a flow rate regulator of the flow input through the inlet valve, an outlet valve for the outflow of the liquids and gases produced by the chemical reaction, and a mode valve movable from a discharge position, in which the fluid produced by the chemical reaction is conveyed to the outlet valve, and a recirculation position, in which said fluid is made to recirculate through the electrochemical cells of the battery; the inlet valve, the outlet valve, the flow rate regulator and the mode valve being grouped in a single external body so as to define a compact monolithic assembly.

12 Claims, 10 Drawing Sheets

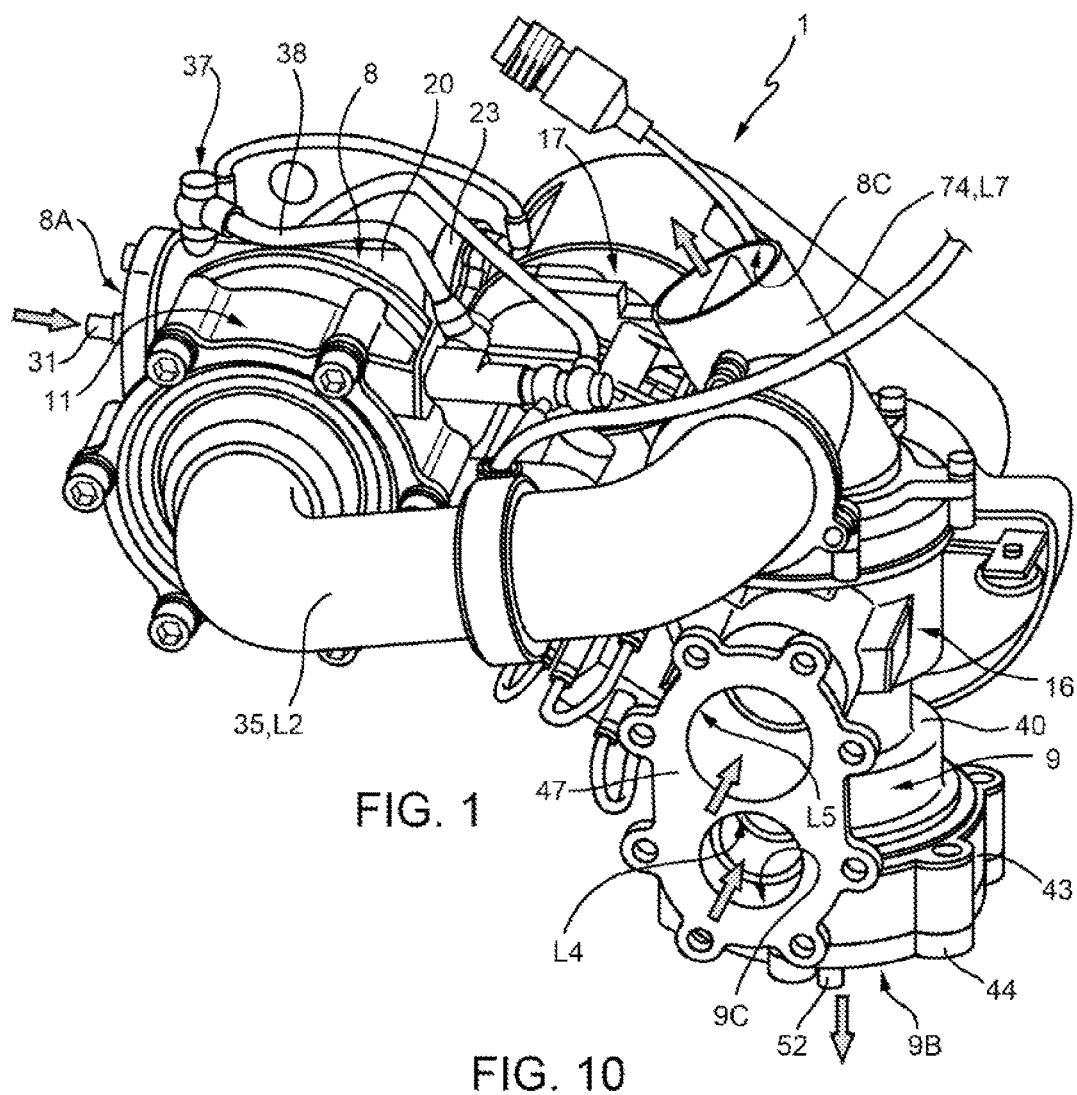
FIG. 1
FIG. 10
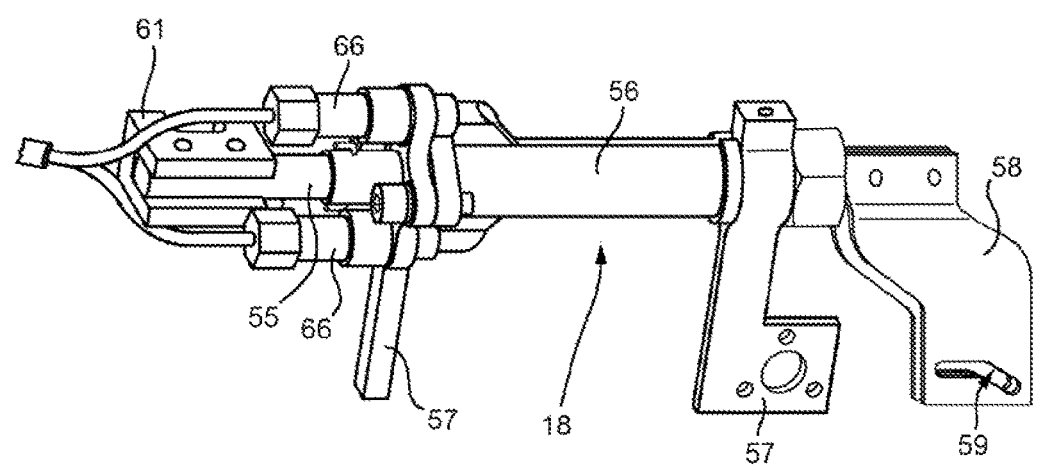

ACTIVATION AND OPERATION MODE SYSTEM FOR AN ELECTRO CHEMICAL BATTERY FOR THE PROPULSION OF MARINE, IN PARTICULAR SUBMARINE MEANS

The present invention relates to an activation and operation mode system for an electrochemical battery for the propulsion of a marine craft, in particular a submarine craft.

BACKGROUND OF THE INVENTION

As is known, electrochemical batteries of this type are capable of providing high-density power and, for this reason, find particularly advantageous application in powering the high-power electric motors normally used for the propulsion of torpedoes, to which the following description will make explicit reference, without any loss of generality.

Normally, an electrochemical battery of the above-specified type comprises a plurality of electrochemical cells, which are arranged inside a chamber made in the body of the torpedo and contain an anhydrous electrolyte (for example sodium hydroxide), and is controlled by an activation and operation mode system (referred to in short as 'SAM'), which comprises a set of devices having the function of managing, on one hand, the intake of a flow of seawater into the chamber to allow the formation of a liquid electrolyte and, on the other, the discharge from the chamber of the gaseous emissions generated by the chemical reaction and the fluid consisting of liquid electrolyte and/or seawater in the phase of battery activation or cleaning.

In particular, the SAM normally comprises a hydraulic circuit connected to at least one pump for circulation of the fluid in the hydraulic circuit and equipped with a seawater inlet valve, an outlet valve from the SAM for the fluid and reaction gas and a switching valve having the function of conveying the gas leaving the chamber to the outlet valve and, based on the operating phase of the battery, to selectively convey the fluid leaving the chamber either to the outlet valve, for example in the phase immediately following activation of the battery, or, via the pump, back inside the chamber again, for example when the battery is "operating regularly" and the fluid, consisting of liquid electrolyte, must be recirculated through the electrochemical cells.

Furthermore, the SAM normally comprises a seawater intake control device capable of adjusting the flow of water fed to the chamber based on the external pressure, i.e. the depth reached by the torpedo.

In addition to the above-mentioned devices, the SAM comprises a plurality of other mechanical and electromechanical components having the function of physically connecting the various parts of the SAM together and enabling the interaction and synchronization of the parts during operation of the battery. It follows that the structure of the SAM is normally quite complex and intrinsically delicate, both from the mechanical viewpoint, due to the large number of components, and with regard to the management of the components. The SAM thus has a particularly important and central role in the operation of the torpedo, as the failure of even just one of its constituent parts during the craft's mission can significantly compromise operation of the electrochemical battery and, in consequence, the operation of the craft itself.

SUMMARY OF THE INVENTION

The object of the present invention is to provide an activation and operation mode system for an electrochemical battery for the propulsion of marine craft, this system being composed of a small number of components and having a structure that is simple, compact, relatively light and intrinsically robust and efficient.

According to the present invention, an activation and operation mode system for an electrochemical battery for the propulsion of a marine craft is provided as claimed in claim 1 and, preferably, in any of the successive claims directly or indirectly dependent on claim 1.

BRIEF DESCRIPTION OF THE DRAWINGS

The invention shall now be described with reference to the accompanying drawings, which illustrate a non-limitative embodiment, in which:

FIG. 1 shows a perspective view of a preferred embodiment of the activation and operation mode system of the present invention;

FIG. 10 shows a perspective view, on an enlarged scale, a detail of FIG. 2; and

DETAILED DESCRIPTION OF THE INVENTION

Figure 2:
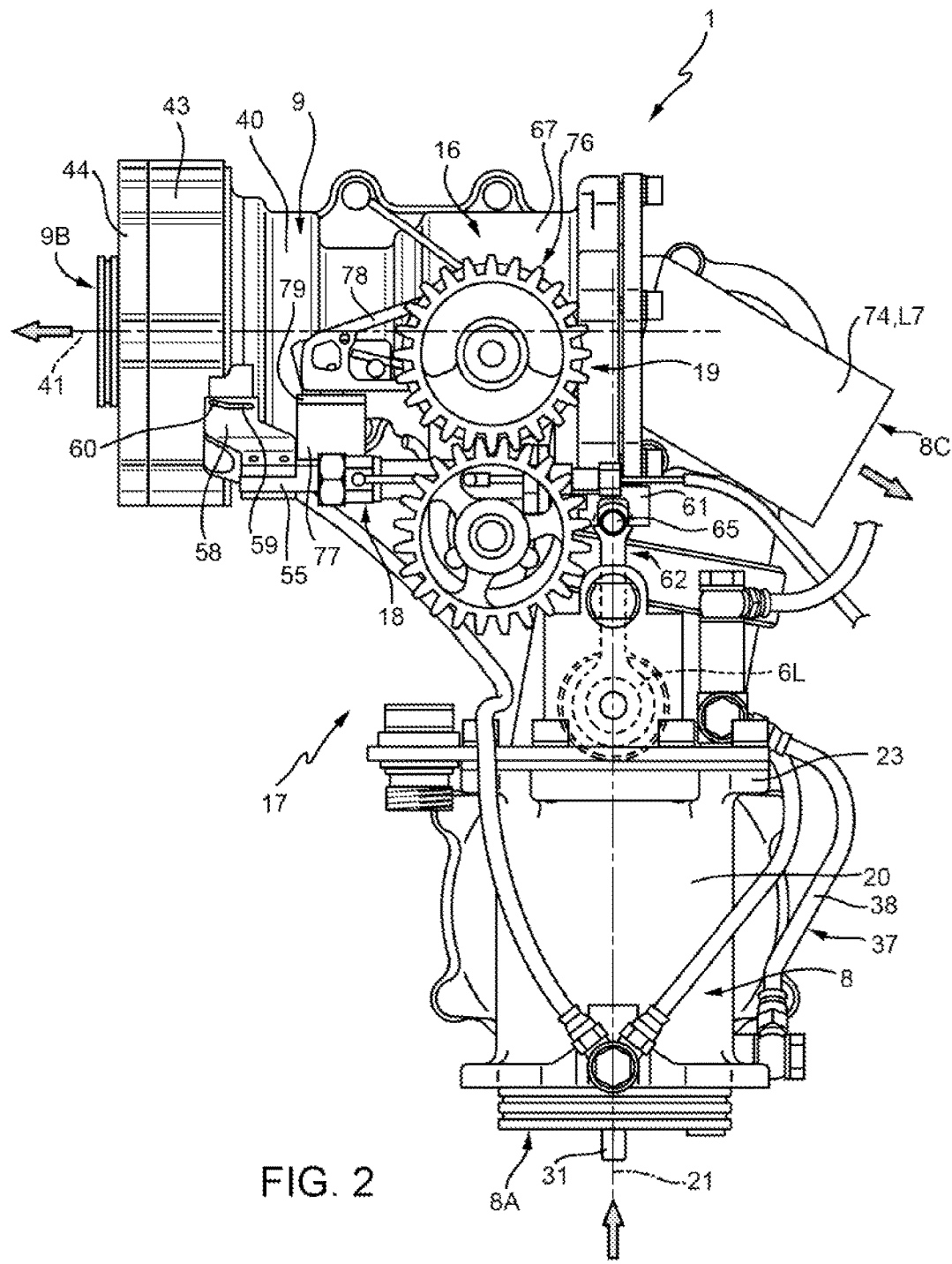
FIG. 2 shows a side view, with parts removed for clarity, of the system in FIG. 1.

In FIG. 1, reference numeral 1 indicates, as a whole, an activation and operation mode system (hereinafter indicated as 'SAM' for brevity) for operating and controlling an electrochemical battery used for the propulsion of a marine craft, in this case a torpedo.

The SAM 1 is composed of a plurality of mechanical members physically and functionally interconnected to each other so as to form a compact and robust monolithic assembly.

Figure 11:
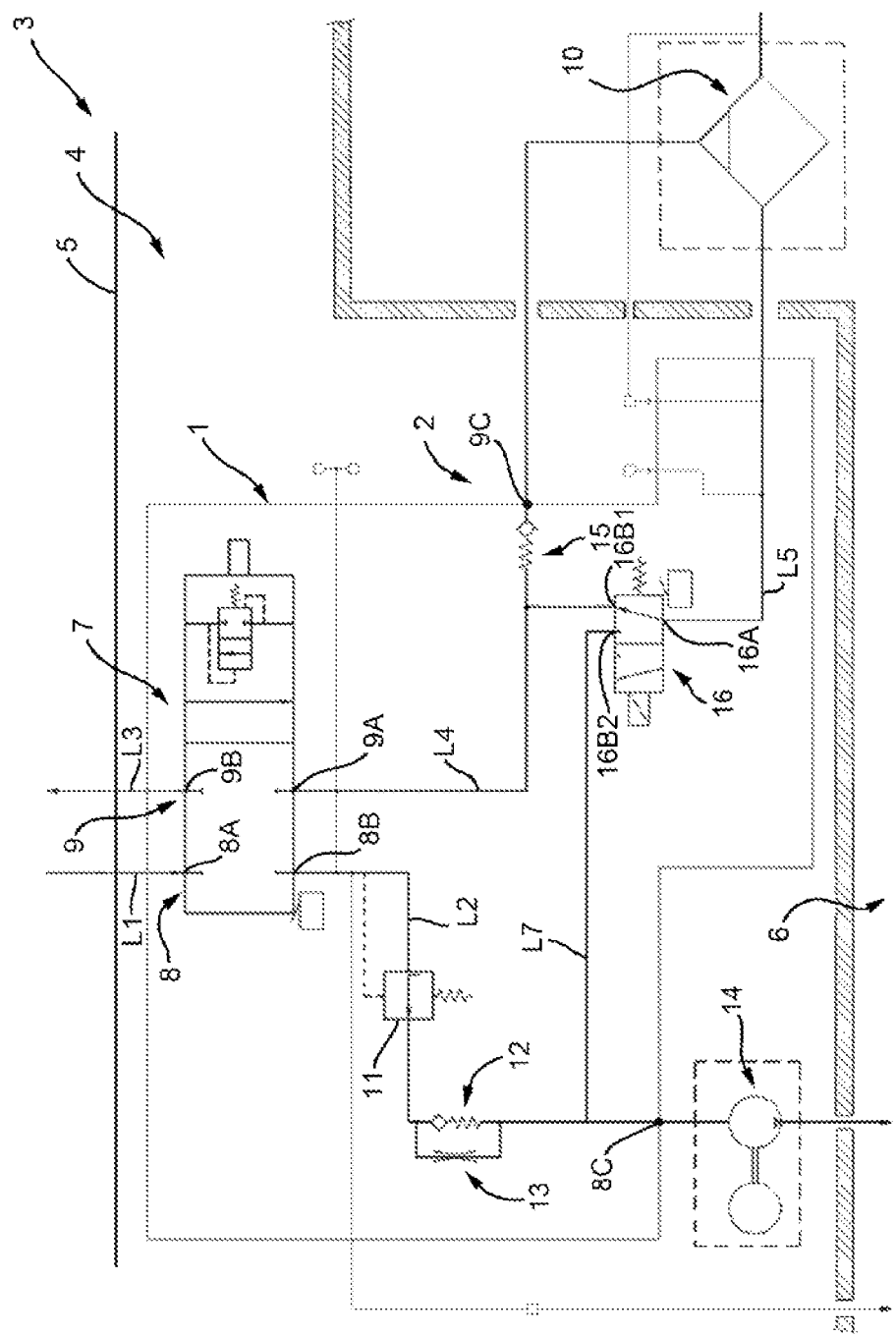
FIGS. 11, 12 and 13 show functional diagrams of the system of the present invention in different respective-operating phases.
Figure 12:
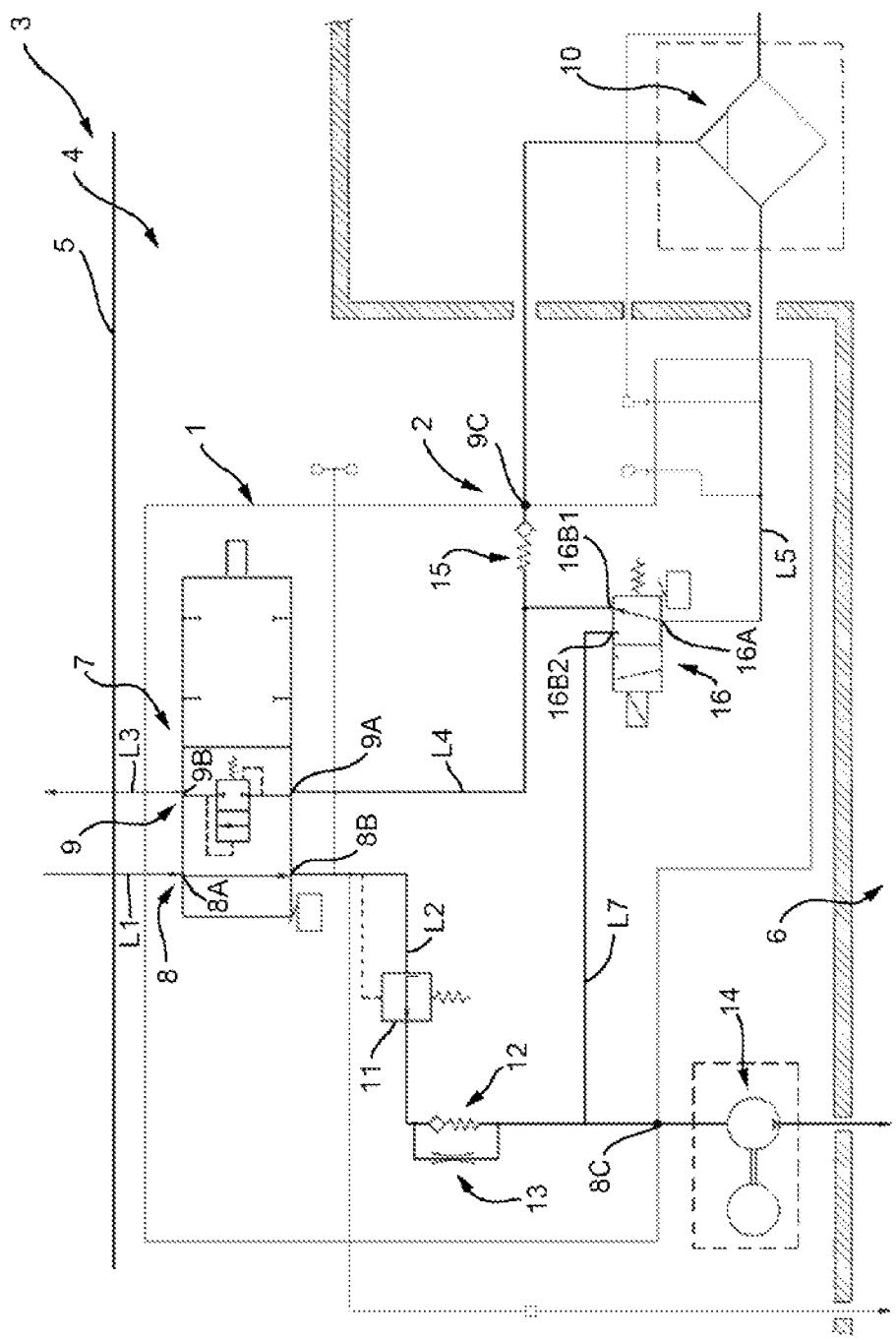
Figure 13:
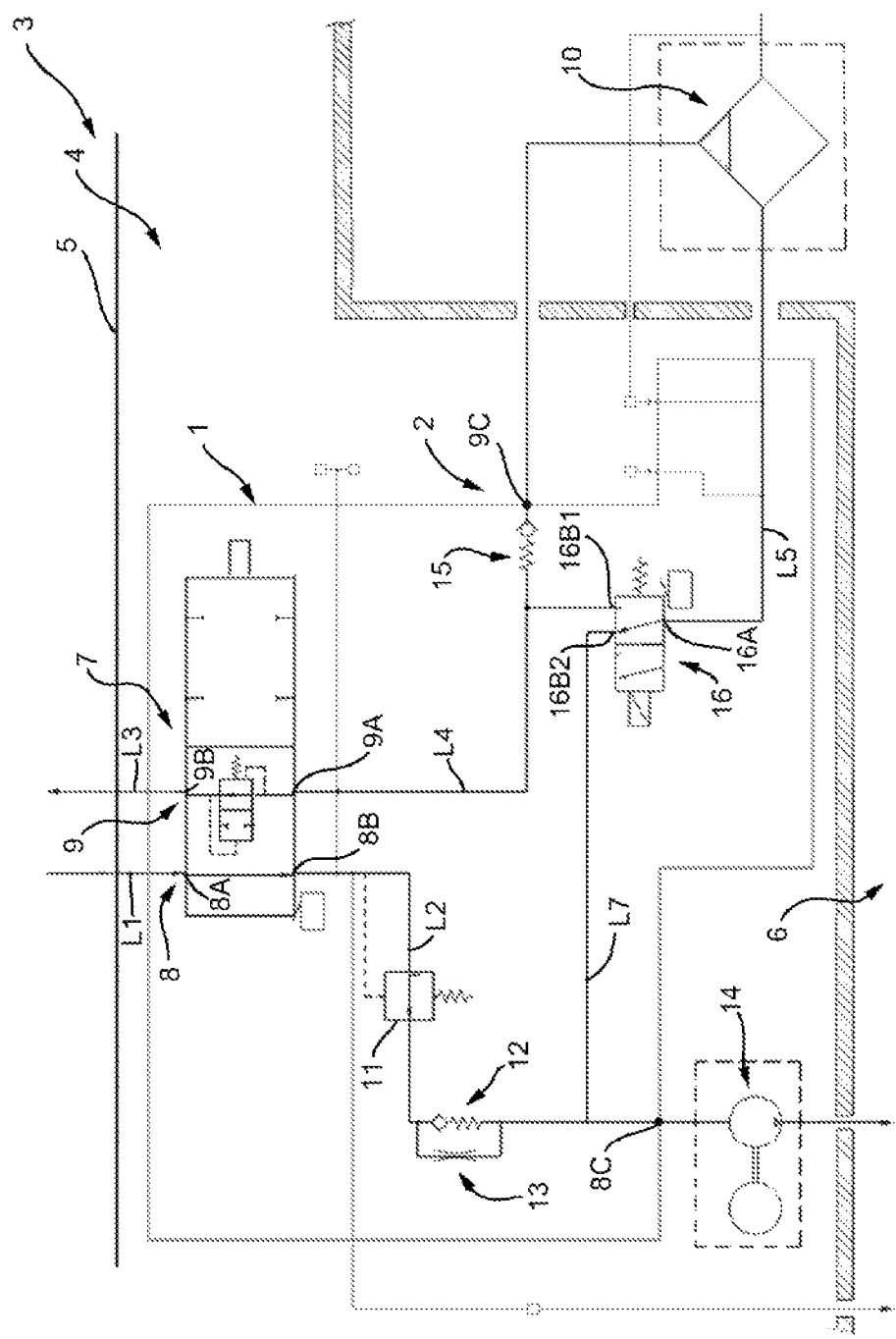

From the functional viewpoint, the SAM 1 operates according to the hydraulic layout shown in FIGS. 11-13, in which the SAM 1 is represented as a portion (delimited by an unbroken line) of a hydraulic circuit 2 and is composed of a plurality of hydraulic elements and connection lines designed to put the hydraulic elements of the SAM 1 in communication with each other, the outside environment and the electrochemical battery.

In particular, according to that shown in FIG. 11, the SAM 1 is housed inside the torpedo 3 in a dry area 4, isolated from the marine environment by an outer shell 5 of the torpedo 3, and is fluidically connected (in the manner indicated in detail further on) to a fluid-tight chamber 6.

The fluid-tight chamber 6 contains a certain amount of anhydrous electrolyte (for example powdered NaOH) and a plurality of electrochemical cells (of known type and not shown), in which, in use and following the intake of seawater inside the chamber and formation of the liquid electrolyte, the chemical reaction that enables transforming chemical energy into electrical energy takes place.

Referring to FIG. 11, the SAM 1 comprises a valve unit 7 with two inlets and two outlets, which enables the SAM 1 to fluidically communicate with the marine environment and actually comprises two valves, each having an inlet and an outlet and connected to each other via a common control member. In particular, the two valves comprise an valve 8, which has an inlet 8A communicating with the marine environment through a line L1 and an outlet 8B communicating with the chamber 6 through a line L2, and an outlet valve 9, which has an outlet 9B communicating with the marine environment through a line L3 and an inlet 9A, which is connected, through a line L4, to a gas outlet of a phase separator 10 housed inside the chamber 6.

The phase separator 10 has the function of separating, in use, the gaseous component (mainly H2) that forms in the liquid electrolyte due to the chemical reaction inside the electrochemical cells.

A flow rate regulator 11 and a non-return valve 12 are arranged in series along the line L2 that runs from the outlet 8B of the inlet valve 8. The flow rate regulator 11 has the function of maintaining the flow of seawater admitted through the inlet valve 8 within a predetermined range of values independently of changes in external pressure, while the non-return valve 12, which is provided with a by-pass 13 designed to allow seawater to flow to the inlet valve 8 for the purpose of balancing, in use, the variations in volume of the two-phase fluid (electrolyte and gas) contained inside the chamber 6 following a change in the external pressure on torpedo, i.e. the depth reached by the torpedo.

Downstream of the non-return valve 12, line L2 extends outside of the SAM 1, through an outlet 8C and through a pump 14, a delivery line of which communicates directly with the inside of the chamber 6.

Line L4, which enters the outlet valve 9 through inlet 9A, has a non-return valve 15 arranged along it, positioned immediately downstream of an inlet 9C through which line L4 extends inside the SAM 1, with the function of preventing gas from flowing back to the phase separator 10.

In addition to the valve unit 7, the SAM 1 comprises a mode or switching valve 16, the function of which is to convey the flow of liquid flowing out from the chamber 6 either towards the outlet valve 9 to discharge it into the sea or recycle it to the chamber 6 through the pump 14. In particular, as will be explained in detail below, the external discharge of the fluid flowing out from the chamber 6 occurs in an initial phase of activation of the battery, when the fluid leaving the chamber 6 is mainly gas and the liquid part is mainly composed of seawater, or in a washing phase of the electrochemical cells. Instead, the recirculation of the fluid leaving the chamber 6 back through the chamber 6 occurs when the battery is "operating regularly", i.e. when the fluid leaving the chamber 6 is substantially pure liquid electrolyte.

The mode valve 16 is a three-way valve and has an inlet 16A placed in fluidic communication with a liquid outlet of the phase separator 10 by a line L5, which extends from the chamber 6 inside the SAM 1 through an inlet 16S. The mode valve 16 also has two outlets 16B1 and 16B2, of which outlet 16B1 is connected via a line L6 to line L4, in a section of line L4 downstream of the non-return valve 15, while outlet. 16B2 is connected via a line L7 to line L2, in a section of the latter downstream of the non-return valve 12 and upstream of the pump 14.

According to that shown in FIGS. 1 and 2, the SAM 1 is actually defined by two bodies arranged one with respect to the other to form an L and integrally connected together to define a single monolithic body 17 in which the inlet valve 8, the flow rate regulator 11, the outlet valve 9, the non-return valves 12 and 15, the mode valve 16, a control device 18 for the inlet valve 8 and outlet valve 9 and a control device 19 for the mode valve 16 are integrated. One of the two bodies constituting body 17 defines a portion of the inlet of the SAM 1 and incorporates the inlet valve 8 and the flow rate regulator 11, while the other body defines an outlet portion of the SAM 1 and incorporates the mode valve 15 and the outlet valve 9.

Figure 3:
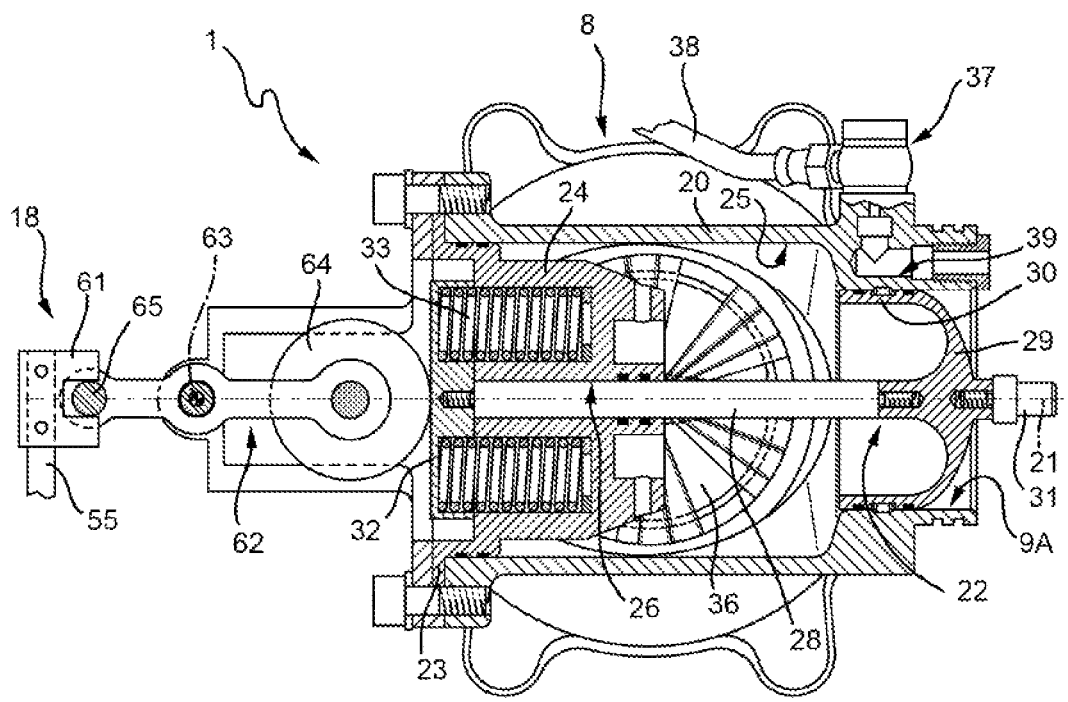
FIGS. 3 and 4 show, in cross-section, a detail of the system in FIG. 1 in different respective operating configurations.
Figure 4:
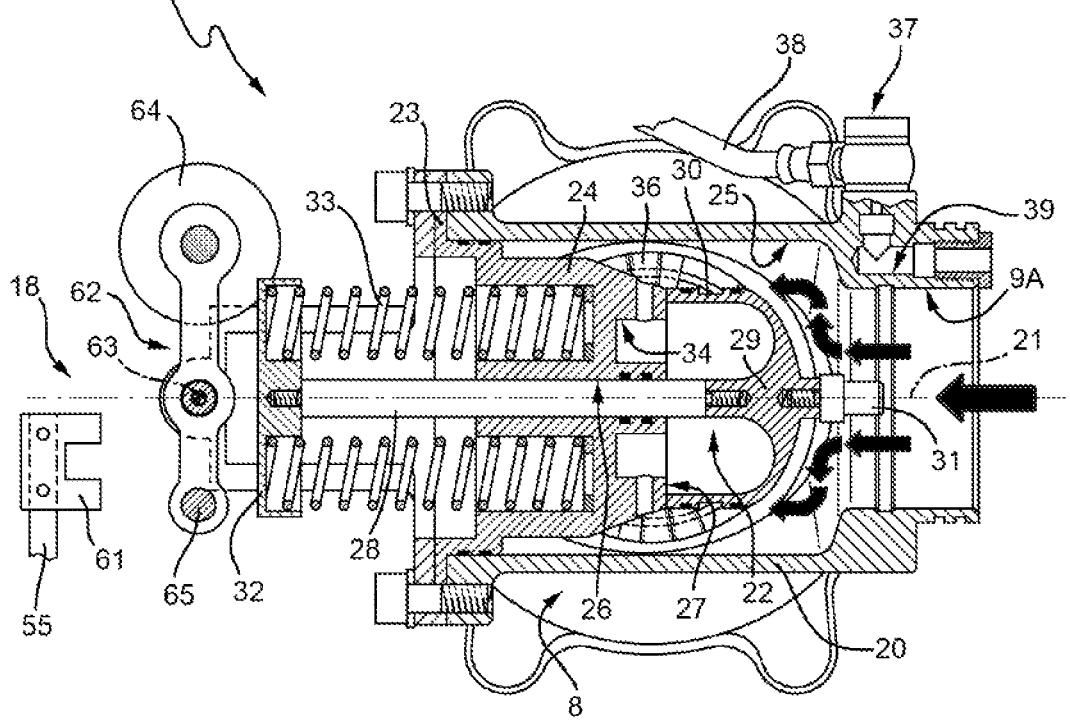

According to that shown in FIGS. 3 and 4, the inlet valve 8 comprises a tubular cylindrical body 20, which has an axis 21, slidingly houses a piston 22 and has, at one of its axial ends, a tubular appendage coaxial with axis 21 and defining the seawater inlet. 8A. At the opposite end with respect to inlet 8A, the cylindrical body 20 is closed by a flange 23 provided with a tube 24, which extends inside the cylindrical body 20 to define, with the cylindrical body 20, a chamber 25. The tube 24 also has a through hole 26 coaxial with axis 21 and is limited, towards the inlet 8A, by a flat surface 27 transversal to axis 21. The tube 24 acts as a guide element for the piston 22, which comprises a rod 28 engaged in the hole 26 in a sliding fluid-tight manner, and a head connected to an axial end of the rod 28 and defining a shutter 29 of the inlet valve 8.

In particular, the shutter 29 is defined by a dome-shaped element with its cavity facing the chamber 25, laterally delimited by a cylindrical side wall 30 coaxial with axis 21 and provided, on its convex end surface, with an appendage protruding axially from the shutter 29 and defining, as will be seen below, a control indicator 31 of the open/closed state of the inlet valve 8. The shutter 29 is movable, in use, between a closed position of the inlet 8A (FIG. 3), in which the side wall 30 is fluid-tightly coupled to the inlet 8A and prevents seawater from entering the chamber 25, and an open position (FIG. 4), in which the shutter 29 is arranged abutting against the end surface 27 of the tube 24 and leaves the inlet 8A free, allowing seawater to enter inside the chamber 25.

The movement of the shutter 29 between the mentioned closed and open positions is performed by a control member 18 (the structure of which will be described hereinafter), which acts on the piston 22 via a plate 32, which is integral with the free end of the rod 28, is transversal to axis 21 and is connected to tube 24 by a plurality of coil springs 33 compressed between the plate 32 and the tube 24.

As shall be better described hereinafter, in the closed position of the inlet valve 8, the control member 18 imparts an axial force on the plate 32 that compresses, against the thrust of the springs 33, the plate 32 against the tube 24 in such a way that the rod 28 extends through the chamber 25 and the shutter 29 engages inlet 8A. Furthermore, in this position the indicator 31 protrudes outside the inlet 8A, in this way providing an operator with a visual indication of the closed state of the inlet valve 8.

Instead, in the open position of inlet valve 8, the control member 18 does not impart any axial force on the plate 32, leaving the plate 32 free to move away from the tube 24 under the action of the springs 33 so as to make the shutter 29 retract, via the rod 28, and thus free the inlet 8A. Furthermore, in this position, the indicator 31 is in a retracted position inside the chamber 25 and thus, by no longer being visible from the outside, provides an operator with a visual indication of the open state of the inlet valve 8.

According to that shown in FIGS. 3 and 4, the tube 24 has radial openings close to the end surface 27 that are designed to place the chamber 25 in communication with an annular relief cavity 34 made in the surface 27. The chamber 25 defines outlet 8B and communicates with pipe 35, which radially runs from the cylindrical body 20 and identifies line L2 through which seawater flows towards the chamber 6. A tubular casing integrated with the cylindrical body 20 is arranged in a position between the pipe 35 and the cylindrical body 20 and houses the flow rate regulator 11. The flow rate regulator 11 is of the adaptive type and comprises a bladed rotor 36 capable of mechanically regulating the flow of incoming water based on the speed of the water passing through it.

As the flow rate regulator 11 is structured in such a way that it is arranged in a fully open configuration in rest conditions, it would not be able to arrest the water hammer due to the sudden intake of seawater when the inlet valve 8 is opened. In order to avoid, this repercussion, the SAM 1 provides a compensation system 37 consisting of a pipe 38 that connects a water inlet duct 39, made in the cylindrical body 20 and parallel to inlet 8A, and a chamber in which a piston acting on the flow rate regulator 11 slides. In this way, before the inlet valve 8 is opened, seawater under pressure is bled through duct 39 and conveyed to said chamber in order to cause at least the partial closing of the flow rate regulator 11 and therefore eliminate or at least reduce the water hammer upon opening inlet 8A.

Figure 5:
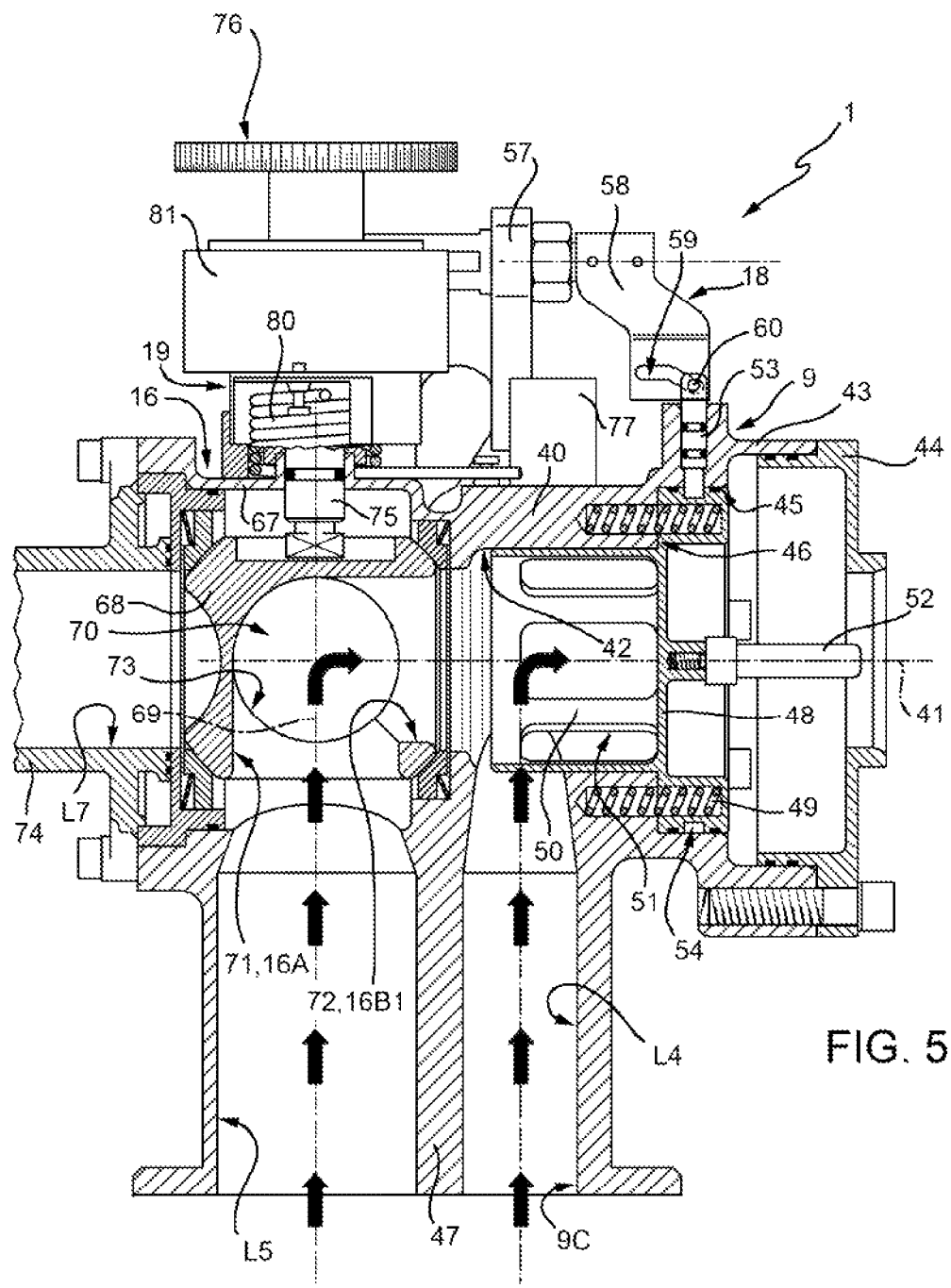
FIGS. 5, 6 and 7 show, in cross-section, a further detail of the system in FIG. 1 in different respective operating configurations.
Figure 6:
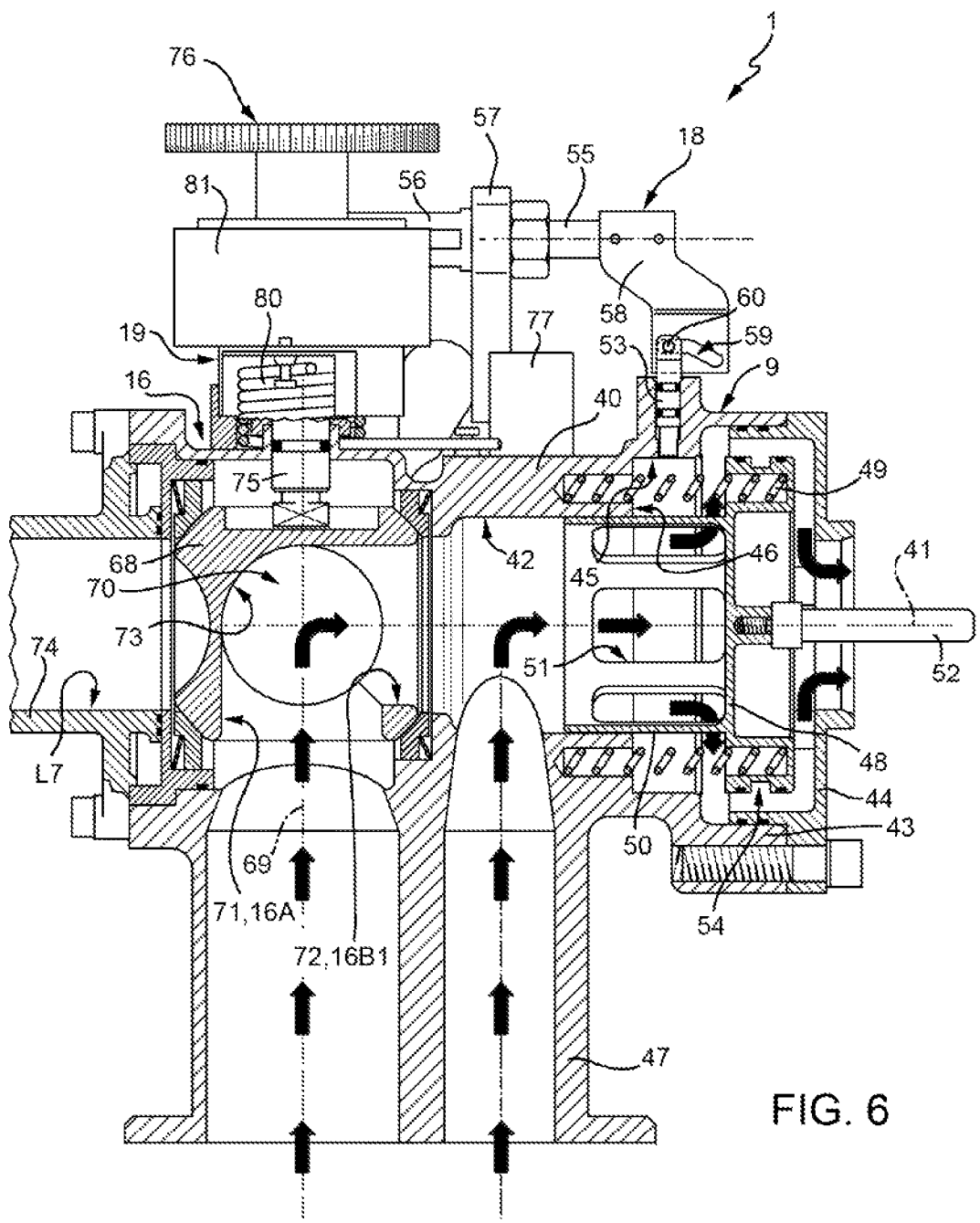

FIGS. 5 and 6 show the outlet valve 9 in a closed position and in an open position, respectively. The outlet valve 9 comprises a cylindrical body 40, which has an axis 41, defines an internal cylindrical chamber 42 and is provided with an outer annular end flange 43 and a cap 44, which is rigidly connected to the axial end of the flange 43 and has, in a position coaxial with axis 41, a tubular appendage that places the inside of the flange 43 in communication with the outside. The flange 43 is internally shaped to define a cylindrical cavity 45, which is coaxial with axis 41, defines outlet 9B, as shall be seen hereinafter, and has a diameter larger than a diameter of chamber 42, to which it is joined by an annular shoulder 46 transversal to axis 41. The cylindrical body 50 is integrally connected on an outer side to a hollow body 47, inside which a duct is provided, which defines the transfer line L4 for gaseous emissions, extending radially with respect to axis 41 and opening directly inside chamber 42.

The outlet valve 9 also comprises a shutter 48, which is movable inside the flange 43, along axis 41, and is defined by a cup-shaped body, which is arranged with its cavity facing towards outlet 9B, has a bottom wall and a side wall having a diameter approximated by defect. to the diameter of the cylindrical cavity 45, and is connected to the cylindrical body 40 via a plurality of coil springs 49 uniformly distributed around axis 41. On the outer side of its bottom wall, the shutter 48 also carries a connected cylindrical sleeve 50, which has a plurality of side openings 51 and is slidingly coupled to the cylindrical side surface of chamber 42. On the opposite side to the sleeve 50, the bottom wall of the shutter 48 carries a connected rod extending along axis 41 and defining a control indicator 52 of the open/closed. state of the outlet valve 9.

In the closed position of the outlet valve 9, the shutter 48 is arranged as shown in FIG. 5, i.e. it is positioned, against the thrust of the springs 49, to abut against shoulder 46 and fluid-tightly engage the cylindrical cavity 45 in order to seal outlet 9B. The shutter 48 is kept in this position by a safety stop 53 constituted by a radial pin, which is mounted to slide inside a through hole made in the flange 43 and engages, with its own end portion, an annular groove 54, provided in a position coaxial with axis 41 on the outer cylindrical surface of the shutter 48. Furthermore, in this closed position of the outlet valve 9, the indicator 52 does not axially protrude outside of outlet 9B and thus, by no longer being visible, provides an operator with an immediate visual indication of the closed state of the outlet valve 9.

Instead, in the open position, the shutter 48 is arranged as shown in FIG. 6, i.e. it is positioned, under the thrust of the extended springs 49, outside of the cylindrical cavity 45 and leaves outlet 9B free, placing the chamber 42 in communication with the outside. Furthermore, in this position, the indicator 52 axially protrudes outside the outlet 9B, providing an operator with a secure visual indication of the open state of the outlet valve 9.

As previously mentioned, the inlet valve 8 and the outlet valve 9 are connected to each other by the common control device 18, which can be operated by an external control and is structured so as to open the outlet valve 9 and simultaneously move the safety stop 53 from the above-described lock position, in which the outlet valve 9 is closed, to an unengaged position in which the outlet valve 8 is free to open. In other words, the control member 18 is structured so as to achieve deferred opening between the inlet valve 8 and the outlet valve 9 in such a way that the latter can only open when certain conditions of balance occur between the internal and external pressure. In practice, in the moments immediately following the opening of the inlet valve 8, the pressure upstream of the outlet valve 9 is lower than the external pressure, which, combined with the friction of the seals, is capable of opposing the action of the springs 49 that tend to move the shutter 48; thus, despite being freed from the stop 53, the shutter 48 does not move immediately, but remains closed until the internal pressure exceeds a certain value and, together with the thrust imparted by the springs 49, is able to overcome the friction of the seals and the opposing thrust of the external pressure and therefore move the shutter 48 outwards, freeing the outlet 9B. The delayed opening of the outlet 9B with respect to the opening of the inlet 9A avoids that, in the moments immediately following the opening of the inlet valve 8, seawater, which is at a higher pressure than that inside the system, can enter through the outlet 9B and flood the internal ducts of the SAM 1.

From the structural viewpoint, as shown in FIGS. 2, 3, 5 and 10, the control member 18 comprises a rod 55, which is parallel to axis 41 and is slidingly mounted inside a tubular guide 56 rigidly fastened, via opportune mounting brackets 57, on the side of the SAM 1 opposite to that carrying pipe 35. The rod 55 carries, connected to one of its axial ends, a plate provided with a shaped groove 59 engaged in a siding manner by a pin 60 integral with a free end of the safety stop 53 (FIG. 5). At the opposite end, the rod 55 carries a connected U-shaped element 61, which, in rest conditions, engages an end portion of a rocker arm 62 interposed between the U-shaped element 61 and the plate 32 of the piston 22. In particular, the rocker arm 62 is pivoted on a pin integral with the cylindrical body 20 to oscillate about an axis 63 perpendicular to axis 21 and comprises a first arm carrying a roller 64 on the end, and a second arm, opposite to the first, carrying a bar 65 on its end that is perpendicular to axis 21. In rest conditions, the two arms of the rocker arm 62 are aligned along axis 21, the U-shaped element 61 is arranged astride the bar 65 and the roller 64 engages the plate 32 and keeps it pushed against tube 24. In addition, in rest conditions, the pin 60 occupies a front end of the groove 59 (FIG. 5) and is at a distance from the cylindrical body 20 such as to allow the safety stop 53 to occupy its locking position. The control member 18 is operated, in use, by two pyrotechnic actuators 66, which are supported by the tubular guide 56 and are connected to the rod 55 in order to move, when activated, the rod 55 along its axis. The movement of the rod 55 causes movement of the U-shaped element 61, which disengages from the bar 65, unbalancing the rocker arm 62 and leaving it free to rotate about axis 63, and therefore allowing plate 32 to retract under the action of the springs 33, with the consequent retraction of the shutter 29 and opening of inlet 8A. The movement of the rod 55 also causes the simultaneous movement of plate 58. Groove 59 is shaped such that the sliding of the pin 60 therein following movement of plate 58 causes the pin 60 to more away from the cylindrical body 40 and the consequent movement of the stop 53 to an unengaged position (FIG. 6), whereby the shutter 48 is no longer constrained in the respective closed position, but is free to move to the open position when the above-described pressure conditions occur.

Figure 7:
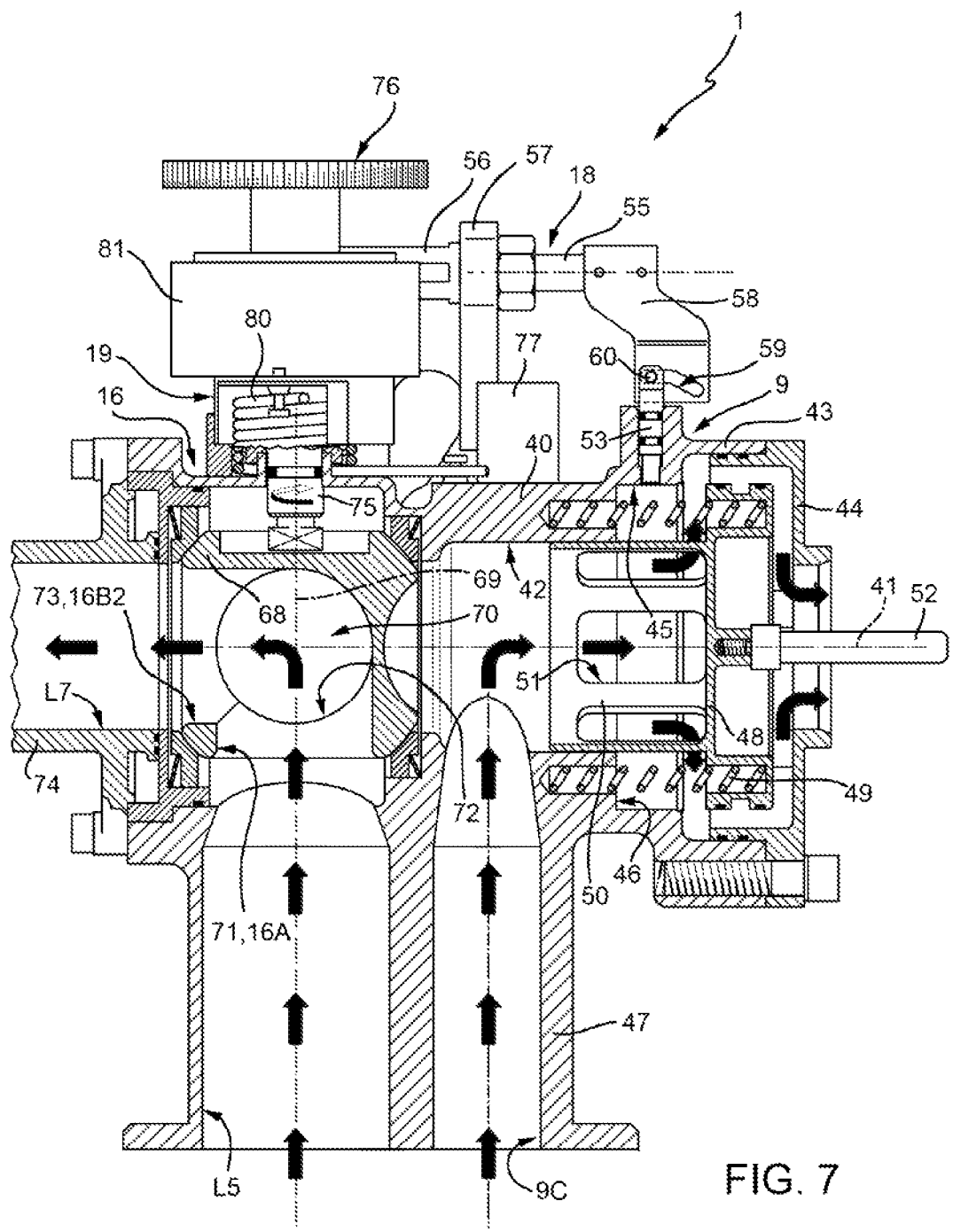

According to that shown in FIGS. 5, 6 and 7, the mode valve is integrated in the outlet valve 9 and comprises a cylindrical body 67 coaxial with axis 41 and integral with cylindrical body 40, and a spherical shutter 68, which is mounted, with the interposition of gaskets, inside the cylindrical body 67 to rotate about an axis 69 perpendicular to the plane defined by axes 41 and 21. The spherical shutter 68 has an inner chamber 70, into which an inlet duct 71 runs and from which two outlet ducts 72 and 73 run. In particular, the inlet duct 71 is coaxial with axis 69, defines inlet 16A and, independently of the position taken by the spherical shutter 68, places the chamber 70 in permanent communication with a duct made in the hollow body 47 and defining line L5, which conveys the electrolytic liquid leaving the chamber 6 to the mode valve 16. The outlet ducts 72 and 73 are arranged at 90° to one another and to the inlet duct 71, defining outlets 16B1 and 16B2, respectively, and are designed to selectively place chamber 70 in communication with chamber 42 of the outlet valve 9 or with a pipe 74 defining line L7, on the basis of the position taken by the spherical shutter 68.

In particular, the shutter 68 is movable between a normal discharge position, in which outlet duct 72 is open and places the inlet duct 71 in communication with chamber 42 of the outlet valve 9 while outlet duct 73 is blind, and a recirculation position, in which outlet duct 73 is open and places the inlet duct 71 in communication with pipe 74 while outlet duct 72 is blind.

The spherical shutter 68 is made to rotate 90° about axis 69 from the discharge position to the recirculation position by a drive shaft 75, which extends, in a position coaxial with axis 69, through the side wall of cylindrical body 67, is connected to the spherical shutter 68 on the side diametrically opposite to the inlet duct 71 and receives drive from a motor reducer (not shown) through a gear drive 76. The drive shaft 75, the gear drive 76 and the motor reducer form part of control device 19, which is totally independent of control device 18 for the inlet 8 and outlet 9 valves and also comprises a safety system that, in the event of failure, ensures that the mode valve 16 autonomously returns so the discharge position.

Figure 8:
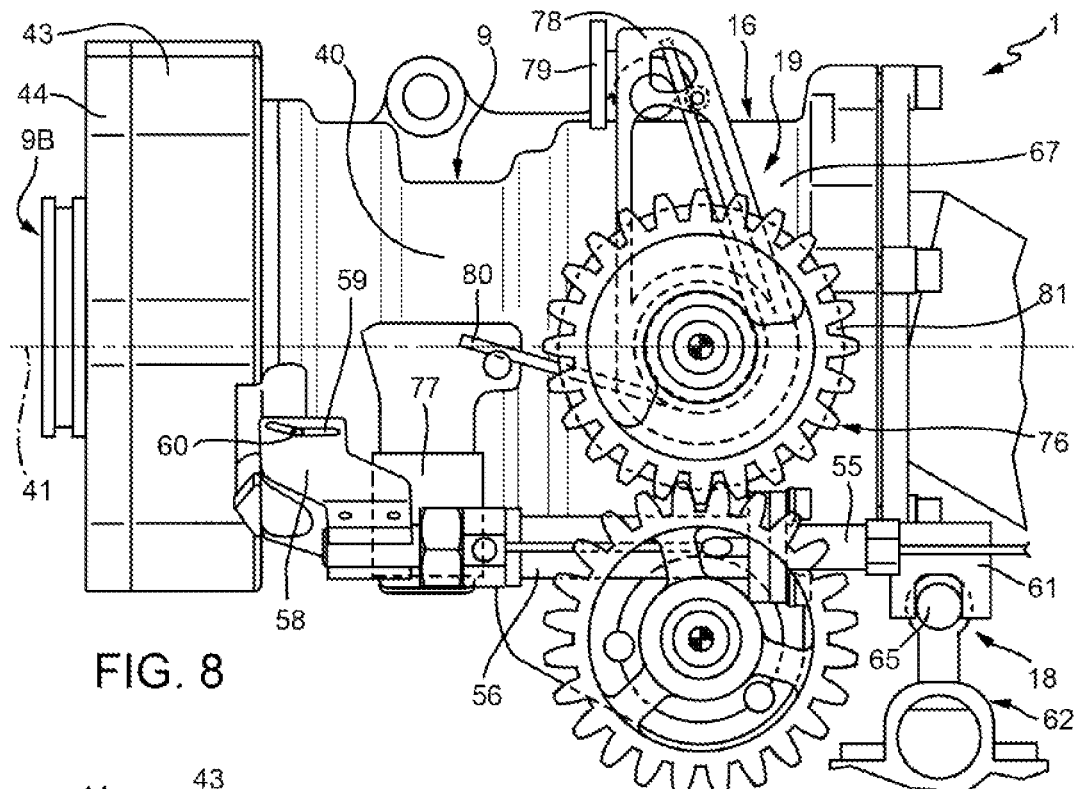
FIGS. 8 and 9 show a detail of FIG. 2 in different respective operating configurations.
Figure 9:
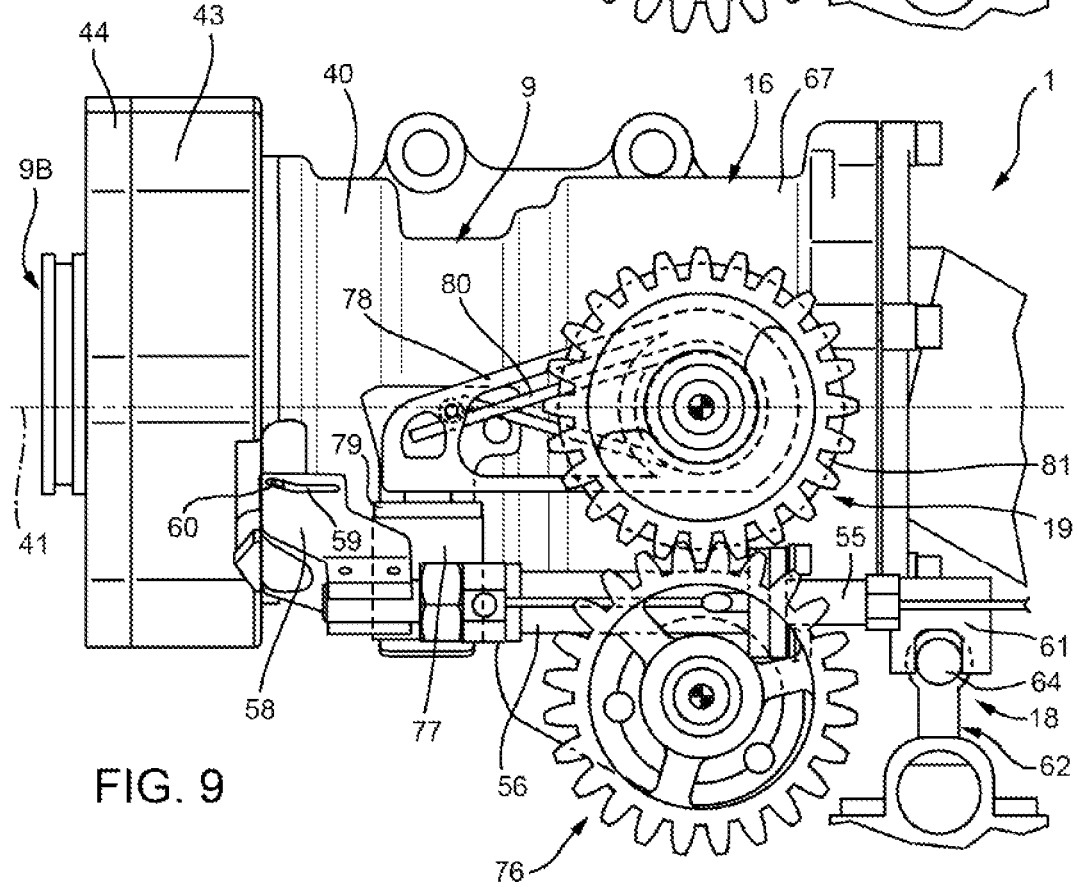

According to that shown in FIGS. 8 and 9, this safety system comprises an electromagnet 77 mounted in a fixed position on the cylindrical body 67 and an arm 78, which is angularly integral with the drive shaft 75 and carries, connected to its free end, an armature 79 for the electromagnet 77. In the rest condition, in which the mode valve 16 is in the discharge position, the safety system takes the position shown in FIG. 8, where the arm 78 radially extends from the drive shaft 75 and is kept in this position, at an angular distance of approximately 90° with respect to the electromagnet 77, by the action of a return spring 80. When it is necessary to switch the mode valve 16 from the discharge position so the recirculation position, the motor reducer (not shown) is powered to impart a quarter-turn rotation to the drive shaft 75, after which the arm 78 rotates and brings the armature 79 into contact with the electromagnet 77. At this point, power to the motor reducer (not shown) is interrupted and the electromagnet 77 is powered, which, because of the interaction with the armature 79, holds the arm 78 against the action of the spring 80 and, in this way, keeps the mode valve 16 in the recirculation position. In the event of a failure or loss of electric power, the electromagnet 77 no longer exerts any force of attraction on the armature 79 and the arm 78 is free to return, pushed by the spring 80, to the rest condition and, in consequence, returns the mode valve 16 to the discharge position.

According to that shown in FIG. 5, to facilitate the work of the spring 80 and allow the arm 78 to perform the backward return movement without excessive effort, an electromagnetic clutch 81 is provided between the output of the gear drive 76 and the drive shaft 75, and is powered on and off together with the motor reducer (not shown) in such a way that, once the mode valve 16 has reached the recirculation position and is held in this position by the electromagnet 77, the spherical shutter 68 is decoupled from the power train arranged upstream of the drive shaft 75 and, in the event of the electromagnet 77 no longer being powered, it is free to easily rotate in the opposite direction under the thrust of the spring 80 to return the mode valve 16 to the discharge position.

The functioning of the SAM 1 clearly follows from what has been set forth above and does not require further detailed explanation.

For the purposes of summarizing, the main phases of the SAM 1 are briefly described below, with reference to the functional diagrams in FIGS. 11, 12 and 13.

Phase 1—All Closed

In this phase, prior to activation of the battery, the inlet valve 8 is in the closed position and does not allow the intake of seawater (FIG. 3); the outlet valve 9 is in the closed position and the mode valve 16 is in the discharge position (FIG. 5); the motor reducer (not shown) and the electromagnetic clutch 81 are not powered.

Phase 2—Open In Input; Closed In Output

In this phase, following activation of the control device 18, the inlet valve 8 in the open position and allows the intake of seawater (FIG. 4); the safety stop 53 has been moved to the non-interference position, but the outlet valve 9 is still closed as the thrust force of the springs 49 and the internal pressure are still not able to overcome the external pressure acting on shutter 48; the mode valve 16 is in the discharge position (FIG. 6).

Phase 3—Open In Input; Open In Output

In this phase, the inlet valve 8 is open; the outlet valve 9 is open; the mode valve 16 is set in the recirculation position (FIG. 7); the clutch 81 is not powered, while the electromagnet 77 is powered and, via arm 78, holds the spherical shutter 68 in the recirculation position (FIG. 9).

In addition to the above-described PHASES (all closed; activation; normal running), a battery washing PHASE can be activated. In this phase, which can be schematically represented as Phase 2 of activation shown in FIG. 12, the inlet valve 8 is open; the outlet valve 9 is open; the mode valve 16 is set in the discharge/washing position; the clutch 81 is not powered and the electromagnet 77 is not powered and spring 80, via arm 78, holds the spherical shutter 68 in the discharge/washing position.

The invention claimed is:

1. An activation and operation mode system for an electrochemical battery for the propulsion of a marine craft, in particular a submarine craft; the battery is of the type comprising a plurality of electrochemical cells housed in a chamber (6) containing an anhydrous electrolyte; and the activation and operation mode system (1) comprises an inlet valve (8) to enable water inflow from the outside; a flow rate regulator (11) to regulate water flow rate through the inlet valve (8); an outlet valve (9) to enable outflow of fluids produced by the chemical reaction; and a mode or switching valve (16) having an inlet (16A), which is fluidically connected to an outlet conduit (L5) from the chamber (6) for a liquid electrolyte outflow, a first outlet (16B1), which is fluidically connected to an inlet (9A) of the outlet valve (9), and a second outlet (16B2), which is fluidically connected to the chamber (6); the activation and operation mode system (1) is characterised in that the inlet valve (8), the outlet valve (9), the flow rate regulator (11) and the mode valve (16) are incorporated in a single outer body (17) so as to define a compact monolithic assembly.

2. An activation and operation mode system according to claim 1, wherein said body (17) comprises a first end portion, in which the inlet valve (8) and the flow rate regulator (11), which are series-connected, are integrated, and a second end portion, in which the mode valve (16) and the outlet valve (9), which are series-connected, are integrated; the first and the second end portion being integrally connected to each other and arranged so as to extend along respective mutually transversal directions.

3. An activation and operation mode system according to claim 1, wherein the inlet. valve (8) and the outlet valve (9) are provided with a common control device (18) of a mechanical type.

4. An activation and operation mode system according to claim 3, wherein the inlet valve (8) has an inlet (8A) and comprises a first shutter (29), which is movable between an open position of the inlet (8A) and a closed position of the inlet (8A) and first elastic return means (33) to move the first shutter (29) from the closed position to the open position; and wherein the outlet valve (9) has an outlet (9B) and comprises a second shutter (48), which is movable between an open position of the outlet (9B) and a closed position of the outlet (9B), and second elastic return means (49) for moving the second shutter (48) from the closed position to the open position; the outlet valve (9) also being provided with a stop element (53) movable between an engaged position, in which the stop element (53) locks the second shutter (48) in the closed position, and a non-interference position, in which the stop element (53) leaves The second shutter (48) free to move to the open position under the thrust of the second elastic means (49).

5. An activation and operation mode system according to claim 4, wherein the control device (18) comprises a first control member (64) associated with the inlet valve (8) and a second control member (58, 59, 60) associated with the outlet valve (9) and mechanically connected to the first control member (64); the control device (18) being movable from a locking position, in which the first control member (64) applies on the first shutter (29) an opposing force to the thrust of the first elastic means (33) to maintain the first shutter (29) in the closed position, to a rest position, in which the first control member (64) does not interfere with the first shutter (29) and leaves the first elastic means (33) free to move the first shutter (29) to the respective open position; the second control member (58, 59, 60) being configured to move the stop element (53) from said engaged position to said non-interference position in response to a movement of the control device (18) from the locking position to the rest position so as to leave the second shutter (48) free to move to the open position under the thrust of the second elastic means (49).

6. An activation and operation mode system according to claim 5, wherein the second elastic means (49) are calibrated to determine movement of the second shutter (48) to the respective open position only when the internal pressure of the system reaches a predetermined value.

7. An activation and operation mode system according to claim 5, wherein the control device (18) comprises a rocker arm (62) provided with a first arm carrying a roller (64), which defines the first control member (64) and, when the control device (18) is in the locking position, cooperates with a portion of the first shutter (29) to impart thereto the aforesaid opposing force; and with a second arm opposite to the first arm with respect to a fulcrum (63) of the rocker arm (62); the control device (18) comprising a rod (55), which is provided, at one end, with cam means (59, 60) defining the second control member (58, 59, 60) and coupled to the stop element (53) to move the stop element between said engaged position and non-interference position; the rod (55) being provided, at the opposite end with respect to the cam means (59, 60), with hook means (61), which cooperate with the second arm of the rocker arm (62) to impart to the same rocker arm (62), following a translation of the rod (55), an oscillation about the fulcrum (63) adapted to move, the roller (64) away from the first shutter (29) and leave it free to move to the open position.

8. An activation and operation mode system according to claim 1, wherein the outlet valve (9) and the mode valve (16) comprise respective external cylindrical bodies (40; 67) integral with one another and coaxial with a first axis (41); the mode valve (16) comprising a spherical shutter (68), which is mounted to rotate about a second axis (69) and has an inner chamber (70) having three openings defining respectively the inlet (16A), the first outlet (16B1) and the second outlet (16B2); drive means (75, 76) are provided for rotating the spherical shutter (68) about the second axis (69) and moving the mode valve (16) between a normal discharge position, in which the inlet (16A) communicates, through the first outlet (16B1), with an inlet (9A) of the outlet valve (9), and a recirculation position, in which the inlet (16A) communicates, through the second outlet (16B2), with a conduit (35, L2) connecting an outlet (8B) of the inlet valve (8) to the chamber (6); the mode valve (16) being arranged immediately upstream from the outlet valve (9) in the direction of circulation of the fluid flowing out from the chamber (6).

9. An activation and operation mode system according to claim 8, wherein. the drive means (75, 76) comprise a drive shaft (75) angularly coupled to the spherical shutter (68) and a mechanical transmission (76) adapted so kinematically connect the drive shaft (75) to an electric motor that may be operated, in use, for a period of time considered necessary to move the mode valve (16) from the normal discharge position to the recirculation position; the mode valve (16) also being provided with a safety device (77, 78, 79, 80) adapted to maintain the mode valve (16) stably in the recirculation position and to return the mode valve (16) from the recirculation position to the discharge position in the case of an interruption of the electrical power supply.

10. A system according to claim 9, wherein said safety device (77, 78, 79, 80) comprises an arm (78) angularly coupled to the drive shaft (75), an armature (79) carried by the arm (78) and an electromagnet (77); the arm (78) being movable, following rotation of the spherical shutter (68) from the discharge position to the recirculation position, from an idle position, in which the arm (78) maintains the armature (79) separated from the electromagnet (77), to an operating position, in which the arm (78) carries the armature (79) into contact with the electromagnets (77); the safety device (77, 78, 79, 80) also comprising elastic return means (80) to impart a backward rotation to the arm (78) to return it to the idle position when the electromagnet (77) is no longer powered and no longer exerts any retaining force on the armature (79).

11. An activation and operation mode system according to claim 9, and comprising an electromagnetic clutch (81) arranged between the drive shaft (75) and the mechanical transmission (76) to uncouple the drive shaft (75) from the electric drive motor when the mode valve (16) is arranged in the recirculation position.

12. An electrochemical battery for the propulsion of marine craft, in particular submarine craft, comprising an activation and operation mode system according to claim 1.

\* \* \* \* \*